(12) United States Patent
Murray

(10) Patent No.: US 11,618,369 B2
(45) Date of Patent: Apr. 4, 2023

(54) SIDE WALL ASSEMBLY FOR USE IN A PICKUP TRUCK BED

(71) Applicant: JVIS-USA, LLC, Shelby Township, MI (US)

(72) Inventor: Shawn P. Murray, Oxford, MI (US)

(73) Assignee: JVIS-USA, LLC, Shelby Township, MI (US)

( * ) Notice: Subject to any disclaimer, the term of this patent is extended or adjusted under 35 U.S.C. 154(b) by 319 days.

(21) Appl. No.: 17/062,835

(22) Filed: Oct. 5, 2020

(65) Prior Publication Data

US 2022/0105861 A1   Apr. 7, 2022

(51) Int. Cl.
*B60P 7/15* (2006.01)
*B60P 3/40* (2006.01)

(52) U.S. Cl.
CPC .. *B60P 7/15* (2013.01); *B60P 3/40* (2013.01)

(58) Field of Classification Search
CPC ...... B60P 7/15; B60P 3/40; B60P 3/00; B62D 33/00
USPC ......... 296/3, 50, 57.1, 32, 36; 410/104, 105, 410/150
See application file for complete search history.

(56) References Cited

U.S. PATENT DOCUMENTS

| | | | |
|---|---|---|---|
| 4,472,639 A | 9/1984 | Bianchi | |
| 4,779,916 A * | 10/1988 | Christie | B60R 9/00 296/26.05 |
| 4,955,660 A * | 9/1990 | Leonard | B60P 3/341 296/100.18 |
| 5,316,357 A | 5/1994 | Schroeder | |
| 5,431,472 A * | 7/1995 | Coffland | B60R 9/00 296/10 |
| 5,816,637 A | 10/1998 | Adams et al. | |
| 6,152,510 A | 11/2000 | Newsome | |
| 6,634,689 B1 * | 10/2003 | Soto | B60P 7/08 211/195 |
| 6,766,913 B2 * | 7/2004 | Steen | B68C 1/002 224/403 |
| 7,494,169 B2 * | 2/2009 | Collins | B62D 33/0207 296/3 |
| 7,976,089 B2 * | 7/2011 | Jones | B60P 3/40 410/121 |
| 8,690,219 B1 * | 4/2014 | Calvert | B60P 3/40 296/3 |
| 8,905,280 B2 * | 12/2014 | Martin | B60R 9/00 293/3 |
| 9,452,793 B1 | 9/2016 | Quick | |
| 9,493,123 B2 * | 11/2016 | Martin | B60R 9/00 |
| 9,834,260 B2 | 12/2017 | Quick et al. | |

(Continued)

*Primary Examiner* — Paul N Dickson
*Assistant Examiner* — Sunsurraye Westbrook
(74) *Attorney, Agent, or Firm* — Brooks Kushman P.C.

(57) ABSTRACT

At least one and, preferably, a pair of generally parallel side wall assemblies for use in a pick-up truck bed are provided. Each of the assemblies includes a vertically extending side wall having an upper surface and a set of linearly spaced pockets extending from the upper surface and into the side wall. Each of the pockets receives and retains a stake in a stowed position within the side wall wherein the bed has a first storage capacity. Each of the pockets allows its stake to move therein to an extended position above the upper surface wherein the bed has a second storage capacity greater than the first storage capacity in the extended positions of the stakes.

18 Claims, 5 Drawing Sheets

(56) References Cited

U.S. PATENT DOCUMENTS

| | | | |
|---|---|---|---|
| 10,131,289 B2* | 11/2018 | Frederick | B60R 9/08 |
| 2020/0148280 A1* | 5/2020 | Elder | B60R 9/10 |

* cited by examiner

US 11,618,369 B2

SIDE WALL ASSEMBLY FOR USE IN A PICKUP TRUCK BED

TECHNICAL FIELD

At least one embodiment of the present invention is generally related to assemblies for increasing the cargo carrying capacity of pickup trucks and, in particular, to such wall assemblies which are used in pickup truck beds.

Overview

There is an ongoing need to increase the cargo carrying capacity of trucks having beds as evidenced by U.S. Pat. Nos. 4,472,639; 5,316,357; 5,816,637; and 6,152,510. As described in U.S. Pat. No. 6,152,510, as is well known, pickup trucks are commonly used for hauling light cargo such as crates and boxes. Pickup truck beds are formed of a floor and extending sidewalls and end walls, one of the latter being hinged to form a tailgate. In general, the volume cargo carrying capacity of the truck bed is limited by the height of the extending sidewalls and end walls.

One means for increasing the cargo capacity of pickup trucks including those having cavities in the side walls or corners thereof is to use a stake and rail assembly to increase the height of the extending side and end walls of the truck bed. The stake members of the assembly are dimensioned to fit within the cavities of the sidewalls or corners, when such cavities are present, and rails are then attached extending horizontally between the stakes.

Two common problems exist with such stake and rail assemblies. First, although the end wall extension that rides above the front end of the bed may be attached by bolts, fittings or otherwise to the side wall extensions, the end wall extension that rides over the tailgate portion of the bed is either not attached, only loosely attached, or held by a side bolt or some similar arrangement to the side wall extensions. Thus, when the truck is in motion, the wall extension over the tailgate tends to rattle. Second, it is not always desirable to have the entire stake and rail extension package mounted on the vehicle, for example, as when full access to the unextended bed of the truck is desired. In such a case, it becomes necessary to either find an "off-truck" location to store the rear wall extension that rides over the tailgate, or alternatively, to store the same in the bed of the truck either lying down or horizontally against the side of the truck. The latter storage technique uses valuable cargo space, allows the section to slide around in the bed, or provides another source of undesirable noise as the section moves about the bed. The former is inconvenient since the operator must return to the storage location in order to recover and, reinstall the section.

U.S. Pat. Nos. 9,452,793 and 9,834,260 are related to at least one embodiment of the present invention.

SUMMARY OF EXAMPLE EMBODIMENTS

An object of at least one embodiment of the present invention is to provide one or more side wall assemblies capable of deploying to increase cargo carrying capacity of a truck and which is always available for use.

In carrying out the above object and other objects of at least one embodiment of the present invention, a side wall assembly for use in a pick-up truck bed is provided. The assembly includes a vertically extending side wall having an upper surface and a set of linearly spaced pockets extending from the upper surface and into the side wall. Each of the pockets receive and retains a stake in a stowed position within the side wall wherein the bed has a first storage capacity. Each of the pockets allows its stake to move therein to an extended position above the upper surface wherein the bed has a second storage capacity greater than the first storage capacity in the extended positions of the stakes.

Each of the stakes may be supported for linear motion within its pocket.

Each of the stakes may be supported for rotary movement about an axis within its pocket.

The assembly may further include a horizontal rail coupled to the stakes to move therewith.

The assembly may further include a plurality of horizontal rails coupled to the stakes to move therewith.

The assembly may further include a top horizontal rail which extends between distal ends of the stakes to at least partially define a top rail of the side wall in the stowed positions of the stakes.

Two of the stakes may include grooves for receiving and retaining at least one rail within the grooves in the extended positions of the stakes.

Each of the stakes may include a top surface at distal end of the stake wherein the top surfaces at least partially define a top rail surface of the side wall in the stowed positions of the stakes.

Each of the stakes may include a side surface wherein the side surfaces at least partially define a top rail surface of the side wall in the stowed positions of the stakes.

Each of the stakes may include a bottom surface at a proximal end of the stake wherein the bottom surfaces at least partially define a top rail surface of the side wall in the stowed positions of the stakes.

Further in carrying out the above object and other objects of at least one embodiment of the present invention, a pair of generally parallel side wall assemblies for use in a pick-up truck bed is provided. Each of the assemblies include a vertically extending side wall having an upper surface and a set of linearly spaced pockets extending from the upper surface and into the side wall. Each of the pockets receive and retains a stake in a stowed position within the side wall wherein the bed has a first storage capacity. Each of the pockets allow its stake to move therein to an extended position above the upper surface wherein the bed has a second storage capacity greater than the first storage capacity in the extended positions of the stakes.

Each of the stakes may be supported for linear motion within its pocket.

Each of the stakes may be supported for rotary movement about an axis within its pocket.

Each of the assemblies may further include a horizontal rail coupled to its stakes to move therewith.

Each of the assemblies may further include a plurality of horizontal rails coupled to its stakes to move therewith.

Each of the assemblies may further include a top horizontal rail which extends between distal ends of its stakes to at least partially define a top rail of its side wall in the stowed positions of its stakes.

Each of the assemblies may include stakes may include grooves for receiving and retaining at least one rail within the grooves in the extended positions of the stakes.

Each of the assemblies may include stakes which include top surfaces at distal ends of the stakes wherein the top surfaces at least partially define a top rail surface of its side wall in the stowed positions of its stakes.

Each of the assemblies may include stakes which include side surfaces wherein the side surfaces at least partially define a top rail surface of its side wall in the stowed positions of its stakes.

Each of the assemblies may include stakes which include bottom surfaces at proximal ends of the stakes wherein the bottom surfaces at least partially define a top rail surface of its side wall in the stowed position of the stakes.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
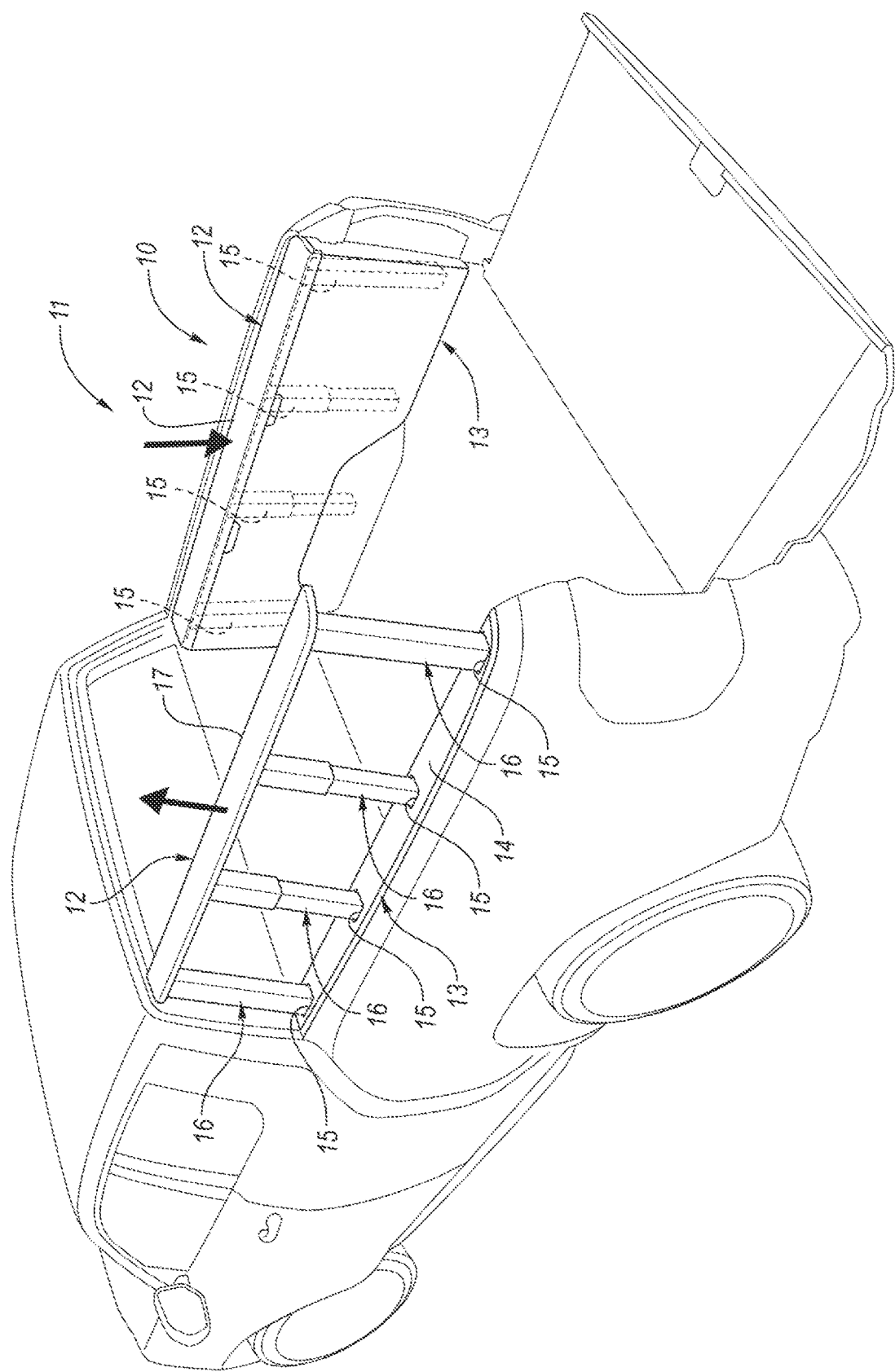
FIG. 1 is a perspective, schematic view of a pick-up truck and its bed including a pair of generally parallel side wall assemblies constructed in accordance with at least one embodiment of the present invention.

In general, and referring specifically to FIG. 1, at least one embodiment of the present invention relates to one or more side wall assemblies for use in a bed, generally indicated at 10, of a pick-up truck, generally indicated at 11. Each assembly, generally indicated at 12, includes a vertically extending side wall, generally indicated at 13, having an upper surface 14 and a set of linearly spaced pockets 15 extending from the upper surface 14 and into the side wall 13. Each of the pockets 15 receives and retains a stake, generally indicated at 16, in a stowed position within the side wall 13 wherein the bed 10 has a first storage capacity. Each of the pockets 15 allows its stake 16 to move therein to an extended position above the upper surface 14 wherein the bed 10 has a second storage capacity greater than the first storage capacity in the extended positions of the stakes 16.

It is to be noted that the parts or components of the pick-up truck and its bed of second, third, fourth and fifth embodiments, which are the same or similar to parts or components of the first embodiment of FIG. 1 in either structure or function, have the same reference number, but a single, double, triple or quadruple prime designation, respectively.

Figure 2:
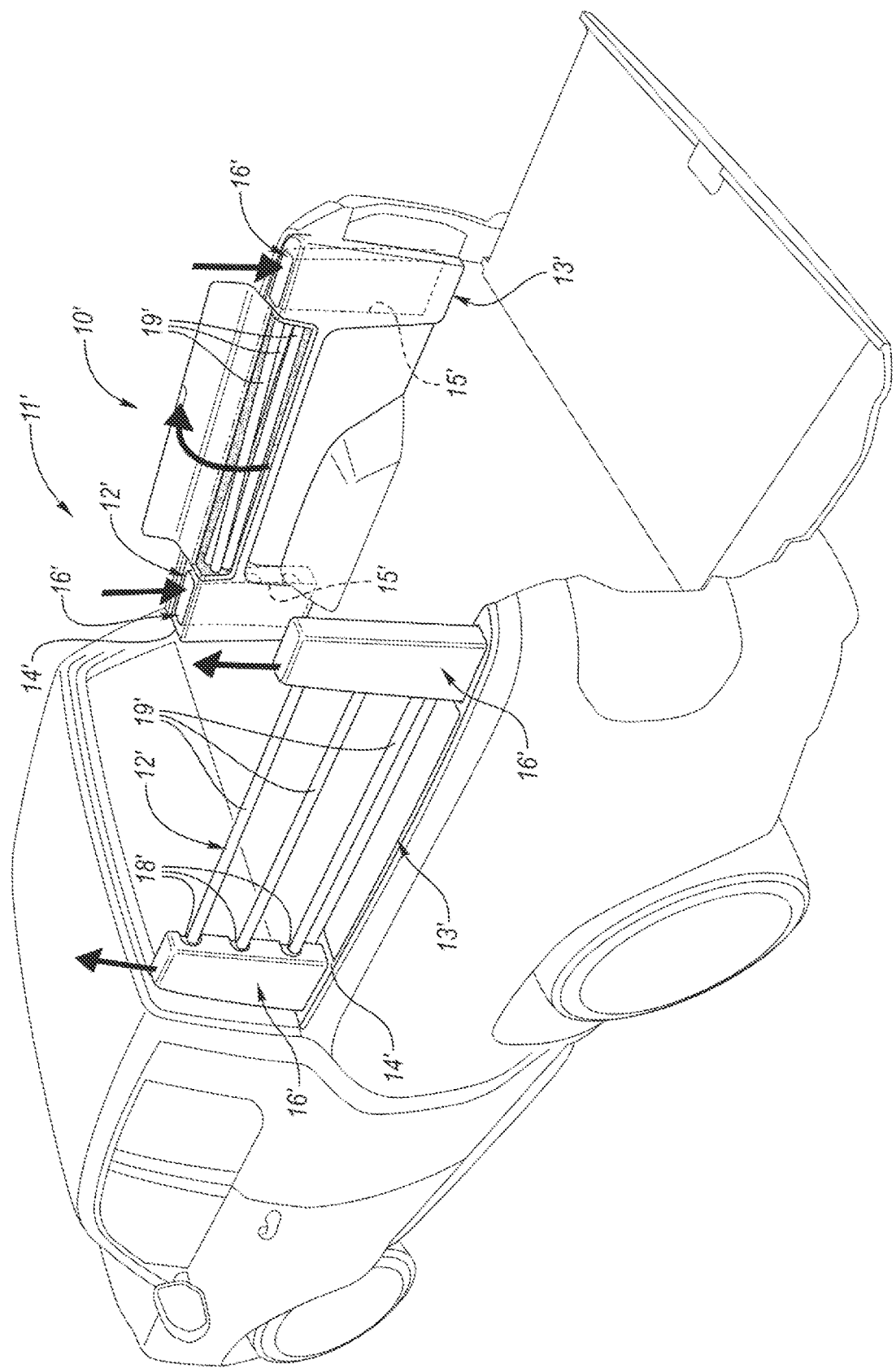
FIG. 2 is a view, similar to the view of FIG. 1, wherein a pair of generally parallel side wall assemblies are constructed in accordance with a second embodiment of the present invention.
Figure 4:
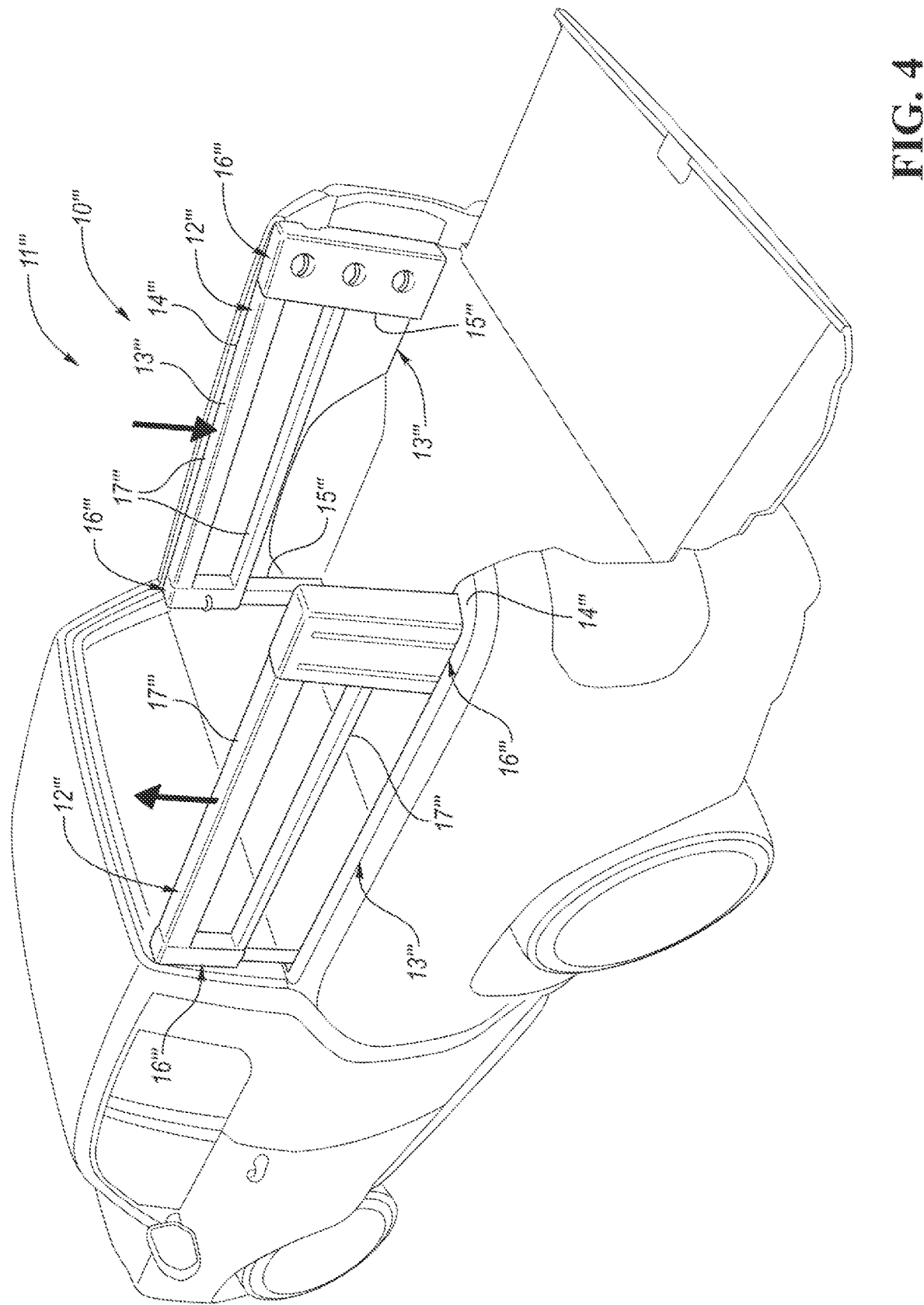
FIG. 4 is a view, similar to the views of FIGS. 1-3, wherein a pair of generally parallel side wall assemblies are constructed in accordance with a fourth embodiment of the present invention.

As shown in FIGS. 1, 2 and 4, each of the stakes 16, 16' and 16''' may be supported for linear motion as indicated by solid straight arrows within its pocket 15, 15' and 15'''.

Figure 3:
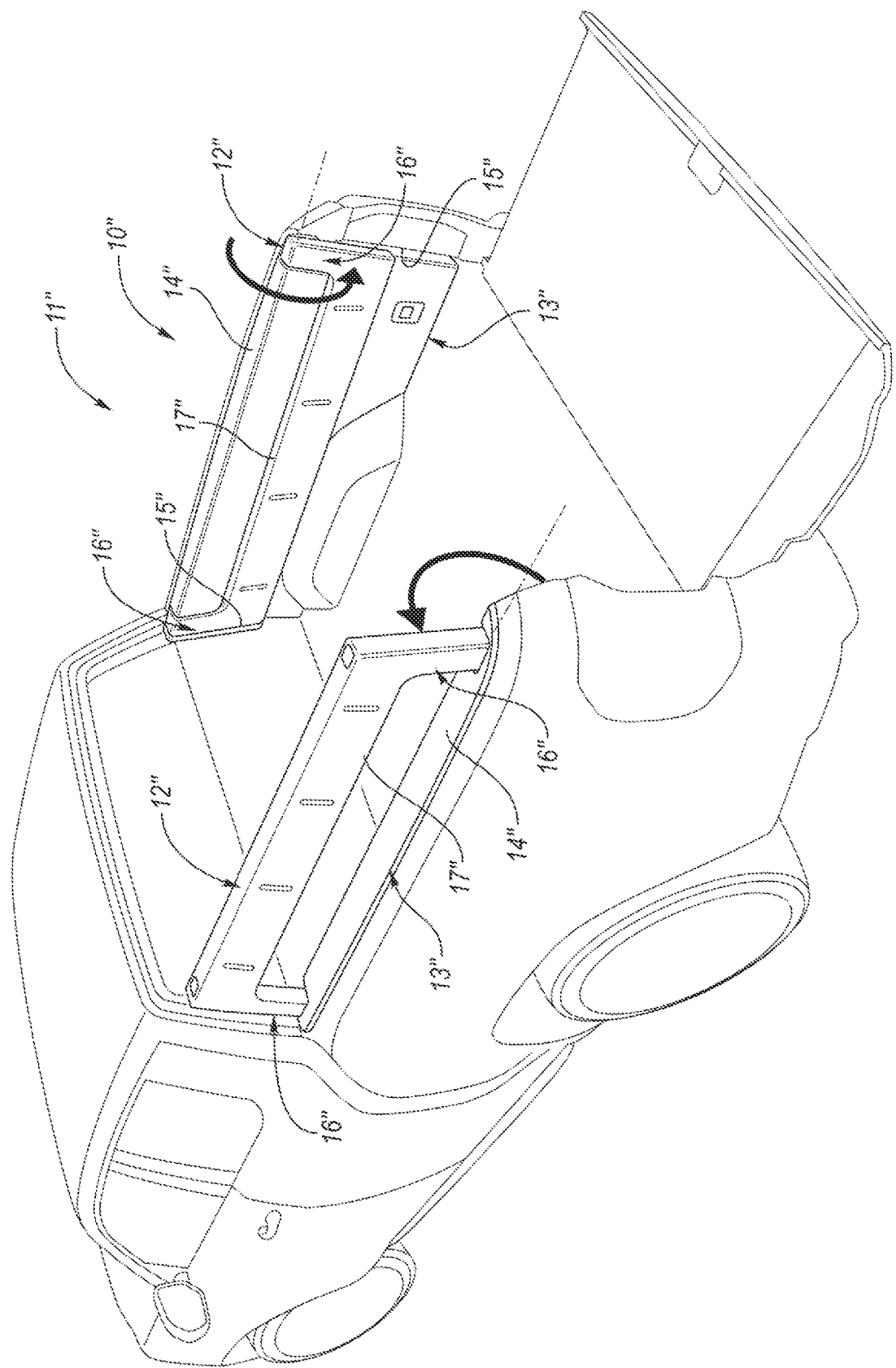
FIG. 3 is a view, similar to the views of FIGS. 1 and 2, wherein a pair of generally parallel side wall assemblies are constructed in accordance with a third embodiment of the present invention.
Figure 5:
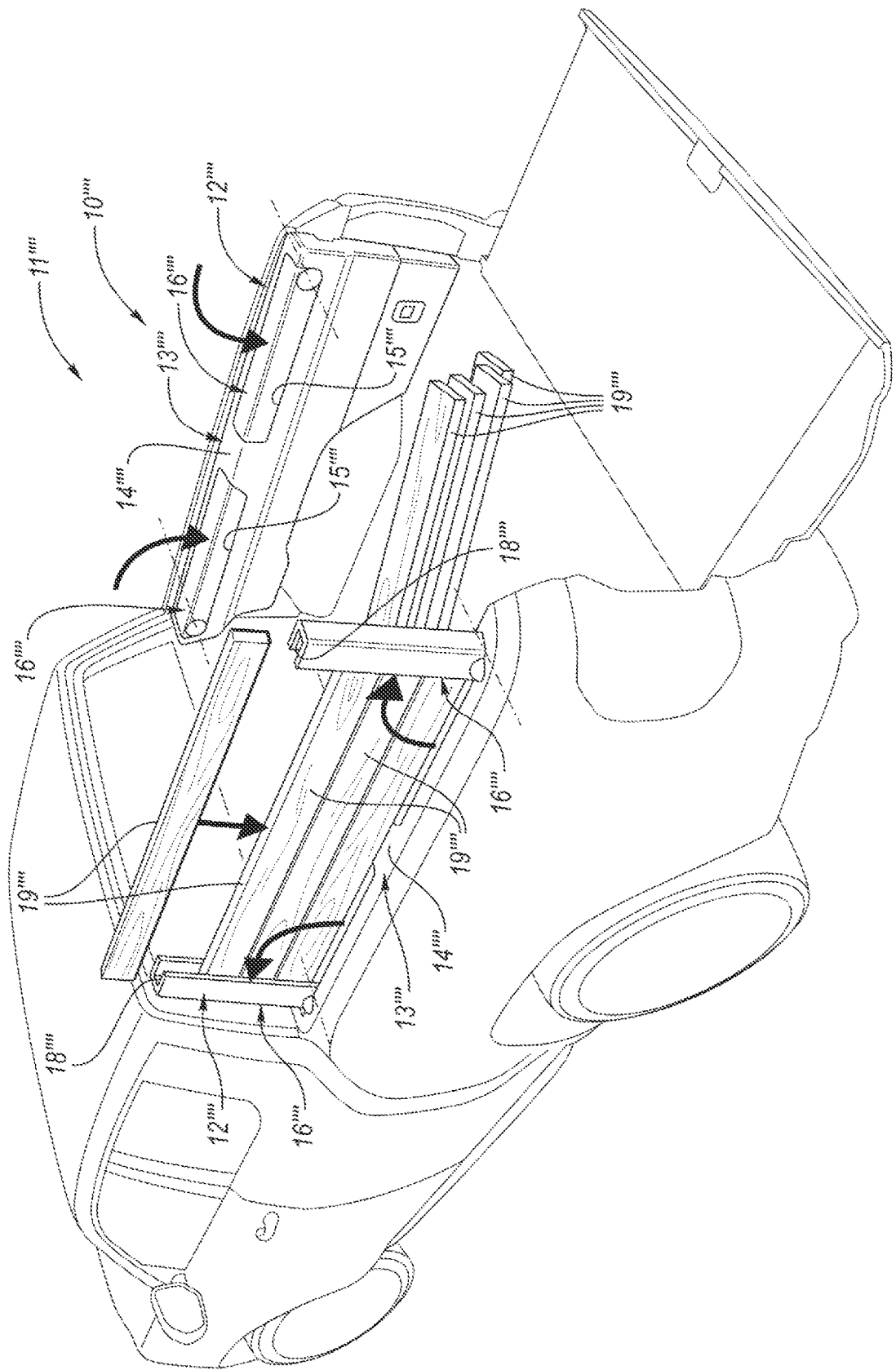
FIG. 5 is a view, similar to the views of FIGS. 1-4, wherein a pair of generally parallel side wall assemblies are constructed in accordance with a fifth embodiment of the present invention.

As shown in FIGS. 3 and 5, each of the stakes 16'' and 16'''' may be supported for rotary movement as indicated by solid curved arrows about an axis within its pocket 15'' and 15''''. As shown in FIGS. 1, 3 and 4, the assemblies 10, 10'' and 10''' may each further include a horizontal rail 17, 17'' or 17''' coupled to its stakes 16, 16'' and 16''' to move therewith.

As shown in FIG. 4, the assembly 10''' may further include a plurality of horizontal rails 17''' coupled to its stakes 16''' to move therewith.

As shown in FIGS. 1 and 4, the assemblies 10 and 10''' may each further include a top horizontal rail 17 or 17''' which extends between distal ends of the stakes 16 or 16''' to at least partially define a top rail of its side wall 13 or 13''' in the stowed positions of the stakes 16 or 16'''.

As shown in FIGS. 2 and 5, two of the stakes 16' and 16'''' may include grooves 18' and 18'''' for receiving and retaining at least one rail 19' and 19'''' within the grooves 18' and 18'''' in the extended positions of the stakes 16' and 16''''.

Each rail 19' of FIG. 2 may be cylindrical rod 19' which can be stowed in a compartment formed in the side wall 13' and covered by a pivotal lid. Each rail 19'''' of FIG. 5 may be an elongated lumber board.

As shown in FIGS. 2 and 4, each of the stakes 16' and 16''' may include a top surface at a distal end of its stake 16' and 16''' wherein the top surfaces at least partially define a top rail surface of its side wall 13' or 13''' in the stowed positions of its stakes 16' and 16'''.

As shown in FIG. 5, each of the stakes 16'''' may include a side surface wherein the side surfaces at least partially define a top rail surface of its side wall 13'''' in the stowed positions of its stakes 16''''.

As shown in FIG. 3, each of the stakes 16'' may include a bottom surface at a proximal end of its stake 16'' wherein the bottom surfaces at least partially define a top rail surface of its side wall 13'' in the stowed positions of its stakes 16''.

As is well known in the art, the stakes 16, 16', 16'', 16''' and 16'''' may be locked in their extended positions by any well known locking mechanisms (not shown) to prevent rattling after the stakes 16, 16', 16'', 16''' and 16'''' have been manually moved from their stowed to their extended positions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A side wall assembly for use in a pick-up truck bed, the assembly comprising:

a vertically extending side wall having an upper surface; and a set of linearly spaced pockets extending from the upper surface and into the side wall, each of the pockets receiving and retaining a stake in a stowed position within the side wall wherein the bed has a first storage capacity and each of the pockets allowing its stake to move therein to an extended position above the upper surface, wherein the bed has a second storage capacity greater than the first storage capacity in the extended positions of the stakes wherein each of the stakes is supported for rotary movement about an axis within its pocket.

2. The assembly as claimed in claim 1, wherein each of the stakes is supported for linear motion within its pocket.

3. The assembly as claimed in claim 1, further comprising a horizontal rail coupled to the stakes to move therewith.

4. The assembly as claimed in claim 1 further comprising a plurality of horizontal rails coupled to the stakes to move therewith.

5. The assembly as claimed in claim 1, further comprising a top horizontal rail which extends between distal ends of the stakes to at least partially define a top rail of the side wall in the stowed positions of the stakes.

6. The assembly as claimed 2, wherein each of the stakes includes a top surface at distal end of the stake and wherein the top surfaces at least partially define a top rail surface of the side wall in the stowed positions of the stakes.

7. The assembly as claimed in claim 1, wherein each of the stakes includes a side surface and wherein the side surfaces at least partially define a top rail surface of the side wall in the stowed positions of the stakes.

8. The assembly as claimed in claim 1, wherein each of the stakes includes a bottom surface at a proximal end of the stake and wherein the bottom surfaces at least partially define a top rail surface of the side wall in the stowed positions of the stakes.

9. A side wall assembly for use in a pick-up truck bed, the assembly comprising:
a vertically extending side wall having an upper surface; and
a set of linearly spaced pockets extending from the upper surface and into the side wall, each of the pockets receiving and retaining a stake in a stowed position within the side wall wherein the bed has a first storage capacity and each of the pockets allowing its stake to move therein to an extended position above the upper surface, wherein the bed has a second storage capacity greater than the first storage capacity in the extended positions of the stakes, wherein two of the stakes include grooves for receiving and retaining at least one rail within the grooves in the extended positions of the stakes.

10. A pair of generally parallel side wall assemblies for use in a pick-up truck bed, each of the assemblies comprising:
a vertically extending side wall having an upper surface;
a set of linearly spaced pockets extending from the upper surface and into the side wall, each of the pockets receiving and retaining a stake in a stowed position within the side wall wherein the bed has a first storage capacity and each of the pockets allowing its stake to move therein to an extended position above the upper surface, wherein the bed has a second storage capacity greater than the first storage capacity in the extended positions of the stakes; and
stakes which include grooves for receiving and retaining at least one rail within the grooves in the extended positions of the stakes.

11. A pair of generally parallel side wall assemblies for use in a pick-up truck bed, each of the assemblies comprising:
a vertically extending side wall having an upper surface; and
a set of linearly spaced pockets extending from the upper surface and into the side wall, each of the pockets receiving and retaining a stake in a stowed position within the side wall wherein the bed has a first storage capacity and each of the pockets allowing its stake to move therein to an extended position above the upper surface, wherein the bed has a second storage capacity greater than the first storage capacity in the extended positions of the stakes wherein each of the stakes is supported for rotary movement about an axis within its pocket.

12. The assemblies as claimed in claim 11, wherein each of the stakes is supported for linear motion within its pocket.

13. The assemblies as claimed in claim 11, wherein each of the assemblies further comprises a horizontal rail coupled to its stakes to move therewith.

14. The assemblies as claimed in claim 11, wherein each of the assemblies further comprises a plurality of horizontal rails coupled to its stakes to move therewith.

15. The assemblies as claimed in claim 11, wherein each of the assemblies further comprises top horizontal rail which extends between distal ends of its stakes to at least partially define a top rail of its side wall in the stowed positions of its stakes.

16. The assemblies as claimed 12, wherein each of the assemblies includes stakes which include top surfaces at distal ends of the stakes and wherein the top surfaces at least partially define a top rail surface of its side wall in the stowed positions of its stakes.

17. The assemblies as claimed in claim 11, wherein each of the assemblies includes stakes which include side surfaces and wherein the side surfaces at least partially define a top rail surface of its side wall in the stowed positions of its stakes.

18. A pair of generally parallel side wall assemblies for use in a pick-up truck bed, each of the assemblies comprising:
a vertically extending side wall having an upper surface;
a set of linearly spaced pockets extending from the upper surface and into the side wall, each of the pockets receiving and retaining a stake in a stowed position within the side wall wherein the bed has a first storage capacity and each of the pockets allowing its stake to move therein to an extended position above the upper surface, wherein the bed has a second storage capacity greater than the first storage capacity in the extended positions of the stakes,
a horizontal rail coupled to its stakes to move therewith; and
stakes which include bottom surfaces at proximal ends of the stakes and wherein the bottom surfaces at least partially define a top rail surface of its side wall in the stowed positions of its stakes.

* * * * *